United States Patent [19]

Berger

[11] 4,271,938
[45] Jun. 9, 1981

[54] HYDRAULIC SHOCK ABSORBING ARRANGEMENT FOR PIPE CONDUIT SYSTEMS

[75] Inventor: Peter W. Berger, Pforzheim, Fed. Rep. of Germany

[73] Assignee: Metallschlauch-Fabrik Pforzheim Witzenmann GmbH, Pforzheim, Fed. Rep. of Germany

[21] Appl. No.: 900,617

[22] Filed: Apr. 27, 1978

[30] Foreign Application Priority Data

May 14, 1977 [DE] Fed. Rep. of Germany ....... 2721890

[51] Int. Cl.³ .............................................. F16F 9/24
[52] U.S. Cl. .................................. 188/280; 74/18.2; 188/298; 188/314; 188/319; 188/322
[58] Field of Search .............. 188/322, 314, 319, 280, 188/298, 282, 317; 137/519.5, 539; 74/18.2

[56] References Cited

U.S. PATENT DOCUMENTS

| | | | |
|---|---|---|---|
| 1,360,833 | 11/1920 | Vuilleumier | 74/18.2 |
| 2,345,164 | 3/1944 | White | 188/280 |
| 2,357,278 | 8/1944 | O'Connor | 188/269 |
| 2,866,223 | 12/1958 | Dillan | 188/322 |
| 3,084,566 | 4/1963 | Pistillo | 188/319 X |
| 3,625,321 | 12/1971 | Lutz | 188/322 X |
| 3,686,708 | 8/1972 | DiNoia et al. | 188/322 X |
| 3,702,646 | 11/1972 | Sherburne | 188/280 X |
| 3,876,040 | 4/1975 | Yang | |
| 4,054,186 | 10/1977 | Banks, Jr. et al. | |
| 4,132,395 | 1/1979 | Fox, Jr. | 137/539 |

FOREIGN PATENT DOCUMENTS 1650086 8/1970 Fed. Rep. of Germany .
767551 2/1957 United Kingdom .................... 188/314

Primary Examiner—George E. A. Halvosa
Attorney, Agent, or Firm—Spencer & Kaye

[57] ABSTRACT

Hydraulic shock absorbing arrangement for pipe conduit systems including a piston slidably mounted in a liquid-filled cylinder to define spaced chambers. The piston has a rod connected thereto which is slidable in a guide positioned at one end of the cylinder. The piston rod is surrounded by a sealing bellows which is secured in a liquid-tight manner at one end to the piston and at its other end to the guide. The cylinder is mounted on a stationary bearing, while the piston rod is connected to a pipe in which shocks are to be damped. A throttling valve communicates with each cylinder chamber, the latter chambers communicating with each other through an overflow path. An expandable compensation bellows communicates with the atmosphere through an air outlet opening, but is otherwise closed.

3 Claims, 2 Drawing Figures

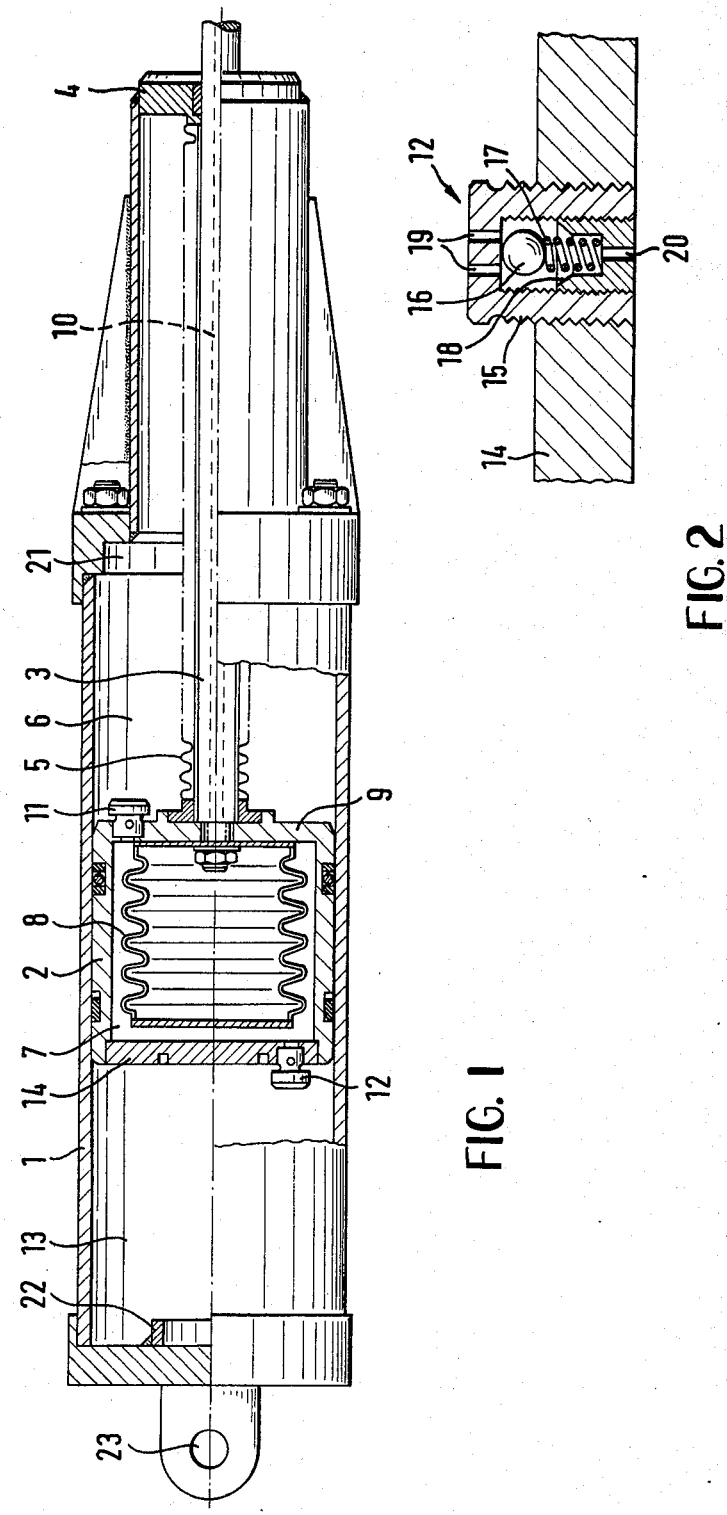

HYDRAULIC SHOCK ABSORBING ARRANGEMENT FOR PIPE CONDUIT SYSTEMS

BACKGROUND OF THE INVENTION

The invention relates to an hydraulic shock absorbing arrangement for pipe conduit systems.

One such shock absorbing arrangement is disclosed in German Offenlegungsschrift [Laid-open Application] No. 1,650,086. Its purpose is to cause the pipe conduit system to be unaffected by normal displacements, originating generally in thermal expansion, and it also acts as a rigid support in the event of rapid, or shock-like, displacements in the form of pipe thrusts, arising from earthquakes, or the like, so that, for instance, in nuclear power stations such pipe thrusts are not transmitted directly to the reactor with resultant damage, but can be dissipated outside the reactor, even if this were to result in damage to the pipe conduit system. For this purpose, there are provided throttle valve assemblies which close in the manner of non-return valves in the event of faster movements in the pipe conduit system, or of intensified flow effects in the pressure liquid caused by these.

In the known shock absorber arrangement, a pressure cylinder is concentrically housed in a supply and compensation container for the pressure liquid, in order to permit losses of the pressure liquid through leakage from a piston rod guide to be compensated. Such shock absorbing arrangements must have a long useful life, together with a high degree of functional safety. The throttling valve assemblies in the cylinder chambers on both sides of the piston are located substantially radially between the supply and compensation containers in the walls of the pressure cylinder. In addition, in the supply and compensation container there is provided a compensation bellows which, on the one hand, absorbs the volume changes arising from temperature fluctuations in the interior of the shock absorbing arrangement and, on the other, serves to compensate for volume changes originating in the differential volumes being displaced by the piston rod on the two sides of the piston as the piston moves.

The conventional shock absorbing arrangement solves the problem of providing a self-contained structural unit without exposed pipes which are subject to damage. However, due to the supply and compensation container surrounding the pressure cylinder, this structural unit is comparatively large and so occupies a comparatively large space, which creates difficulties in the mounting of the unit. Moreover, losses of the pressure liquid through leakage from the piston rod guide make it necessary to keep the arrangement under regular observation, which may necessitate occasional refilling of the supply and compensation container with fresh pressure liquid. This work is expensive and, in the case of nuclear power stations, must be carried out in a highly responsible manner since if it is neglected or carried out in a careless manner, the consequences can be catastrophic.

SUMMARY OF THE INVENTION

It is an object of the present invention to provide a shock absorbing arrangement of the type described above that can be left unattended and is of smaller dimensions, so that the risk of human error is minimized or obviated, and a substantially smaller, lighter, simpler and more versatile unit is provided.

This and other objects are achieved according to the present invention by the provision of an hydraulic shock absorbing arrangement for pipe conduit systems, composed of a piston slidably mounted in a cylinder filled with liquid to divide the cylinder into chambers, a rod connected to the piston and axially slidable in a guide at one end of the cylinder, the cylinder being mounted on a stationary bearing while the piston rod is connected to a pipe to be damped, throttling valve assemblies which communicate, respectively, with cylinder chambers positioned on opposite sides of the piston, an overflow path between the cylinder chambers, an expandable compensation bellows which communicates with the atmosphere through an air outlet opening, but is otherwise closed, and a sealing bellows surrounding the piston rod and secured in a liquid-tight manner at one end to the piston, at the location of its connection with the piston rod, and at its other end to the surface of the guide positioned in the cylinder chamber.

With this arrangement, pressure liquid can no longer escape from the pressure cylinder containing the piston rod. Thus, a supply container for the pressure liquid is no longer required, as the initial charge of pressure liquid will suffice, in the absence of any possible loss, for the entire operational period of the shock absorbing arrangement. The shock absorbing arrangement according to the invention, once operationally tested and properly installed, requires no attention over the projected operational period and so does not depend for efficient functioning on any remedial steps.

Preferably, the inner diameter of the sealing bellows surrounds the outer diameter of the piston rod with minimal clearance. In this way the sealing bellows is supported by the piston rod if outside pressure is applied to it, so that it cannot collapse into the space in the pressure cylinder containing the piston rod under the action of pressure peaks arising in the pipe system.

BRIEF DESCRIPTION OF THE DRAWING

FIG. 1 is a partly cross-sectional elevational view of a preferred embodiment of an hydraulic shock absorbing arrangement according to the present invention.

FIG. 2 is a cross-sectional detail view of a portion of the arrangement of FIG. 1.

DESCRIPTION OF THE PREFERRED EMBODIMENTS

FIG. 1 shows a pressure cylinder 1 accommodating a piston 2, axially slidable therein. Piston 2 thus divides the interior of the cylinder into two cylinder chambers 6 and 13. Piston 2 is equipped with a piston rod 3 which is axially slidably guided in a guide or end cap 4 positioned at the head end of the pressure cylinder 1. The piston rod 3 is surrounded by a sealing bellows 5, which is secured in a liquid-tight manner at one end to the piston 2 adjacent the region of connection of the piston to the piston rod. The other end of bellows 5 is secured to the part of the guide 4 facing the interior of the cylinder 1. The inner diameter of the sealing bellows 5 engages the external diameter of the piston rod 3. Since the sealing bellows 5 is arranged inside a cylinder chamber 6 containing the piston rod 3, it is impossible for the pressure liquid to leak from this cylinder chamber out through the guide 4.

The piston 2 is hollow and in the chamber 7 thus formed is coaxially seated a compensation bellows 8, which is fixed to that inner wall 9 of the piston to which the piston rod 3 is connected. The interior of the compensation bellows 8 communicates with the external atmosphere through an axial bore 10 extending completely through the piston rod 3. Throttling valve assemblies 11 and 12 are positioned in the end walls 9 and 14, respectively, of the piston 2 which face the cylinder chambers 6 and 13, respectively.

The throttling valve assembly 12 is shown to an enlarged scale in FIG. 2 and includes a valve housing 15 which is screwed into a passage through the piston end wall 14 and a valve ball 16 which is seated in a bore in the housing 15 and which is normally urged away from a screwed-in valve seat 18 by a spring 17.

Pressure fluid can enter the valve assembly 12 from the cylinder chamber 13 through bores 19 in the housing 15 and can then pass into the chamber 7 through an axial bore 20 in the valve seat 18. Should, however, the piston 2 move to the left in FIG. 1 to absorb a shock, the ball 16 would be brought into contact with the valve seat 18, thus blocking the flow, under the action of the pressure medium entering the valve assembly 12 from the chamber 13, on the one hand, and by the inertia of its mass, on the other, acting against the spring 17.

Throttling valve assembly 11 is structurally identical to assembly 12 and operates in the same manner if piston 2 moves to the right to absorb a shock.

If the piston 2 should move slowly during normal creeping movements of the pipe conduit system, to which movement the throttling valve assemblies 11, 12 would not respond, the compensation bellows 8 will be compressed if the piston is displaced to the left, as the liquid volume displaced from the chamber 13 is larger than the liquid volume that can be simultaneously received by the chamber 6, due to the presence of piston rod 3 and bellows 5. The condition is reversed, i.e. bellows 8 will expand, in the event of a comparable piston movement to the right.

Because of the construction of the throttling valve assemblies 11 and 12, and due to their projecting outwardly from the piston, the cylinder 1 is provided, adjacent one end, with a stepped recessed portion 21 and, at its other end, with a projecting abutment ring 22. The outer periphery of the wall 9 of piston 2 can thus impact against the outer rim of recessed portion 21, and the wall 14 of the piston 2 may impact against abutment ring 22, so as to prevent a shock contact with the throttling valve assemblies.

The cylinder 1 may be mounted, for example, by means of an eye 23 to a fixed bearing and connected by its piston rod 3 to the associated pipe conduit system.

It will be understood that the above description of the present invention is susceptible to various modifications, changes and adaptations, and the same are intended to be comprehended within the meaning and range of equivalents of the appended claims.

What is claimed is:

1. An hydraulic shock absorbing support for a pipe conduit system comprising: a cylinder filled with a liquid and provided at one end with a piston rod guide; a hollow piston presenting axially spaced end walls and slidably mounted in said cylinder so as to divide the interior of said cylinder into two cylinder chambers separated by said piston; a piston rod having one end connected to one end of said piston and slidable in said guide at said one end of said cylinder, the other end of said rod being arranged to be connected to a pipe of the conduit system a circularly corrugated metal sealing bellows disposed with its interior surface surrounding the outer surface of said piston rod with minimal clearance and secured in a liquid-tight manner between said one end of said piston and the surface of said guide which is located interiorly of said chamber; means for mounting said cylinder to a stationary bearing; means defining an overflow path at the interior of said piston between said cylinder chambers; normally open throttling valve assemblies communicating between each said cylinder chamber and said overflow path and each mounted in a respective piston end wall, each said assembly including a closing member mounted to undergo a closing movement in the direction opposite to a respective direction of movement of said piston during a shock absorbing stroke, under the combined action of the pressure medium in the said chamber adjacent the respective piston end wall and the mass inertia of said closing member; and an expandable compensation bellows which is disposed within said overflow path, is secured to the inner surface of said end wall at the end of said piston to which said piston rod is connected, and whose interior communicates only with the external atmosphere through an air outlet opening formed as an axial bore in said piston rod.

2. An arrangement as defined in claim 1, wherein each said throttling valve assembly is a non-return valve which closes against a spring force.

3. An arrangement as defined in claim 2 wherein the spring force of each valve is adjustable.

* * * * *